Feb. 16, 1965   J. RABINOW ETAL   3,169,484
SELF-CONTAINED TEST DEVICE FOR ORDNANCE MISSILES
Filed April 12, 1956
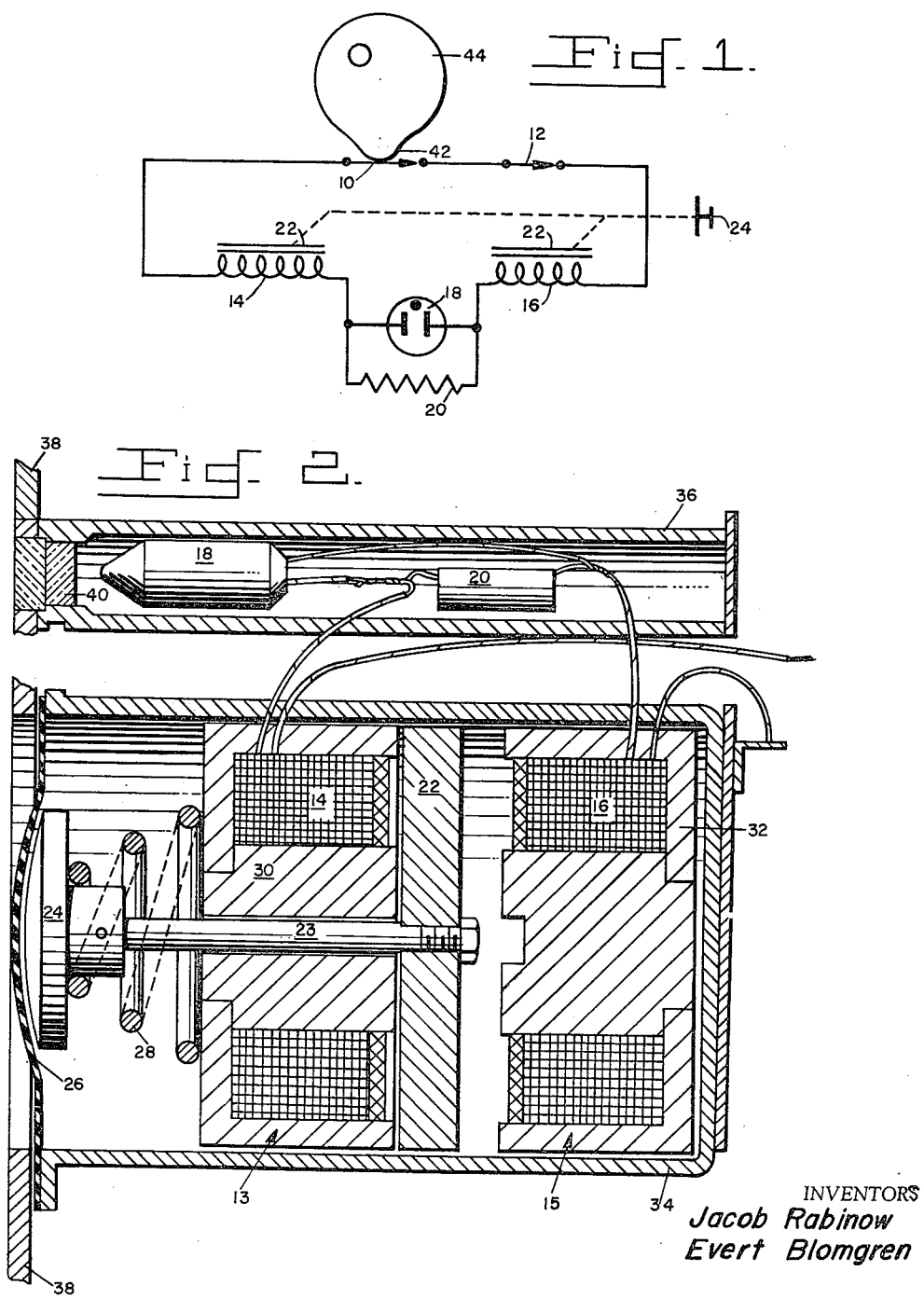
INVENTORS
*Jacob Rabinow*
*Evert Blomgren*
BY
*W. E. Thibodeau, A. W. Pav & J. D. Edgerton*
ATTORNEYS.

United States Patent Office 3,169,484
Patented Feb. 16, 1965

3,169,484
SELF-CONTAINED TEST DEVICE FOR
ORDNANCE MISSILES
Jacob Rabinow, Washington, D.C., and Evert Blomgren, Kensington, Conn., assignors to the United States of America as represented by the Secretary of the Army
Filed Apr. 12, 1956, Ser. No. 577,904
1 Claim. (Cl. 102—70.2)

The invention described herein may be manufactured and used by or for the Government for governmental purposes without the payment to us of any royalty thereon.

This invention relates to means for checking the electrical continuity of a circuit. More particularly, preferred forms of the invention provide, contained within ordance missiles, devices for quickly determining whether the missile is in the safe (unarmed) condition.

In a typical embodiment of the invention an electric switch is mounted on the arming rotor of a missile fuze in such a way that the switch is closed if the rotor is in the safe position but open if the rotor is in the armed position. A plunger-type electromagnetic generator and an indicator lamp are connected in series with the switch. The generator is manually operable by means of a push button at the surface of the missile, and the lamp is visible through a window at the surface of the missile. If the lamp lights when the button is pushed, the missile is shown to be safe. The arrangement is fail-safe (failure in the test circuit or device does not give a false assurance of safety), requires very little electrical energy, has an indefinite storage life, is light in weight and requires very little space within the missile, is rugged and dependable, is readily and economically manufactured, and meets a long felt need in the missile art.

An object of this invention is to provide a self-contained device for testing the safety of ordance missiles.

Another object is to provide a fail-safe test device that uses minimum voltage and energy.

A further object is to provide a test device with a long shelf life.

Still further objects of the invention are to achieve the above with a cheap, simple and reliable device that is easy to manufacture.

The specific nature of the invention as well as other objects and advantages thereof will clearly appear from the following description and drawings in which:

FIG. 1 is a schematic diagram of an arming test arrangement in accordance with the invention.

FIG. 2 is a sectional view of an impulse generator and indicator, mounted in a missile.

As shown in the drawing, the proximate function of the invention is to test the continuity of a circuit which, for example, includes switches 10 and 12 within the missile. This is accomplished by inducing a voltage in coils 14 and 16 and connecting the coils in series with a test lamp 18 and the circuit to be tested.

Voltage is induced in coils 14 and 16 by moving a magnet 22 with respect to them. The magnet is activated through a shaft 23 by push button 24 which is normally held outward against a pliable diaphragm 26 by spring 28 and magnetic forces of the magnet 22 and soft iron core 30 of the coil unit 13 of which coil 14 is a part. When pressure applied manually to button 24 exceeds the force of spring 28 and the magnetic forces, the magnet 22 tends to "jump" to soft iron core 32 of coil unit 15 which contains coil 16. This jump insures the production of substantial voltage, as the voltage is related to the speed of movement of the magnet.

The test lamp 18 is a standard glow discharge lamp which flashes when low voltages are applied. It is shunted by resistor 20 so that any accidentally induced voltages may be discharged. Also the value of this resistor will determine what minimum resistance in the test circuit will cause the lamp to flash.

The entire unit is contained in two housings 34 and 36 which are attached to the skin 38 of the missile. The diaphragm 26 is flush with the skin 38. A glass 40 is placed in front of the lamp 18.

The switch 10 is closed by the camming action of projection 42 on fuze arming rotor 44. If it is desired to check the position of other elements, switches, such as switch 12, may be attached to the elements and these switches connected in series with switch 10. If the switches 10 and 12 are closed, as they should be, when button 24 is pushed a light will appear at glass 40 indicating the missile is safe. If the generator is defective no light will appear; therefore, there is no false feeling of security.

It will be apparent that the embodiment shown is only exemplary and that various modifications can be made in construction and arrangement within the scope of the invention as defined in the appended claim.

We claim:

In an ordnance missile, self-contained means for checking the continuity of a circuit within the missile, said means comprising in combination: a housing mounted within the missile, said housing having a first end and a second end, a first coil mounted in the first end of said housing, a first annular soft iron core mounted concentrically in the center of said first coil, a second coil mounted in the second end of said housing, said second coil being connected in series with said first coil so that the voltages induced in said coils will add, a shaft passing through the first end of said housing and extending through said first core, a push button connected to one end of said shaft, a magnet connected to the other end of said shaft, said magnet being movable between said first core and said second core, and a spring located between said first core and said push button, said spring and the magnetic field of said magnet biasing said push button away from said core and holding said magnet substantially in contact with said first core, the biasing provided by said spring and said magnet being such as to permit said magnet to rapidly jump from said first core to said second core upon manual actuation of said push button, said housing being mounted in said missile so that said shaft is substantially perpendicular with the missile axis and said push button is substantially flush with the skin of the missile, the skin of the missile around said push button being flexible so that manual pressure can be externally applied to said push button through the flexible portion of said skin, an indicator lamp and a resistor in parallel mounted within the missile near the missile skin, a transparent member placed in the missile skin above said lamp, and means connecting said circuit to be checked in series with said first and second coils and the parallel combination of said lamp and resistor, the application of manual pressure to said push button through the flexible portion of the missile skin causing said magnet to rapidly jump to said second core thereby inducing voltages in said first and second coils, the voltages so induced causing a momentary current to flow through said circuit to light said lamp, said light being observable through said transparent member, the intensity of said light providing an indication of the resistance of said circuit.

References Cited by the Examiner

UNITED STATES PATENTS

| | | | |
|---|---|---|---|
| 2,260,639 | 10/41 | Powell. | |
| 2,400,257 | 5/46 | Miller | 102—11 |
| 2,426,322 | 8/47 | Pridham | 310—15 |
| 2,496,316 | 2/50 | Skinner et al. | 89—1.7 |
| 2,603,970 | 7/52 | Metzler et al. | 89—1 |
| 2,655,867 | 10/53 | Jordan | 102—70.2 |
| 2,696,103 | 12/54 | Heilprin et al. | 73—167 |
| 2,779,277 | 6/57 | Smith | 102—70.2 |

FOREIGN PATENTS 525,333    8/40    Great Britain.

BENJAMIN A. BORCHELT, *Primary Examiner.*

SAMUEL BOYD, *Examiner.*